(12) United States Patent
Moss

(10) Patent No.: US 9,098,694 B1
(45) Date of Patent: Aug. 4, 2015

(54) CLONE-RESISTANT LOGIC

(75) Inventor: Roy G. Moss, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 620 days.

(21) Appl. No.: 13/531,244

(22) Filed: Jun. 22, 2012

Related U.S. Application Data

(60) Provisional application No. 61/504,946, filed on Jul. 6, 2011.

(51) Int. Cl.
*G06F 21/44* (2013.01)
*G06F 21/73* (2013.01)
*H03K 5/13* (2014.01)
*H04L 9/08* (2006.01)
*G06F 12/14* (2006.01)

(52) U.S. Cl.
CPC .............. *G06F 21/44* (2013.01); *G06F 12/14* (2013.01); *G06F 12/1425* (2013.01); *G06F 12/1433* (2013.01); *G06F 21/73* (2013.01); *H03K 5/133* (2013.01); *H04L 9/0861* (2013.01); *H04L 9/0866* (2013.01)

(58) Field of Classification Search
None
See application file for complete search history.

(56) References Cited

U.S. PATENT DOCUMENTS

| | | | |
|---|---|---|---|
| 4,754,216 A * | 6/1988 | Wong | 324/76.82 |
| 4,810,975 A * | 3/1989 | Dias | 331/78 |
| 5,450,360 A * | 9/1995 | Sato | 365/200 |
| 5,535,397 A | 7/1996 | Durante et al. | |
| 5,649,135 A | 7/1997 | Pechanek et al. | |
| 5,724,427 A * | 3/1998 | Reeds, III | 380/259 |
| 5,768,500 A | 6/1998 | Agrawal et al. | |
| 5,778,070 A | 7/1998 | Mattison | |
| 5,933,627 A | 8/1999 | Parady | |
| 5,943,493 A | 8/1999 | Teich et al. | |
| 5,961,577 A * | 10/1999 | Soenen et al. | 708/251 |
| 6,018,759 A | 1/2000 | Doing et al. | |
| 6,151,668 A | 11/2000 | Pechanek et al. | |
| 6,154,544 A * | 11/2000 | Farris et al. | 380/262 |
| 6,446,191 B1 | 9/2002 | Pechanek et al. | |
| 6,480,136 B1 * | 11/2002 | Kranz et al. | 341/159 |
| 6,536,024 B1 * | 3/2003 | Hathaway | 327/295 |
| 6,615,355 B2 | 9/2003 | Mattison | |
| 7,203,821 B2 | 4/2007 | Thimmannagari | |
| 7,249,246 B1 | 7/2007 | Banning et al. | |
| 7,315,956 B2 | 1/2008 | Jensen et al. | |
| 7,334,086 B2 | 2/2008 | Hass et al. | |
| 7,401,223 B2 * | 7/2008 | Walmsley | 713/169 |
| 7,434,053 B2 * | 10/2008 | Parry et al. | 713/171 |
| 7,439,883 B1 * | 10/2008 | Moni et al. | 341/60 |
| 7,647,473 B2 | 1/2010 | Kamigata et al. | |
| 7,765,342 B2 | 7/2010 | Whalley et al. | |
| RE41,703 E | 9/2010 | Pechanek et al. | |
| 7,818,542 B2 | 10/2010 | Shen et al. | |
| 8,095,775 B1 | 1/2012 | Khan et al. | |
| 8,116,457 B2 * | 2/2012 | Langton | 380/277 |
| 8,418,006 B1 * | 4/2013 | Trimberger | 714/725 |

(Continued)

OTHER PUBLICATIONS

Menezes et al., "Handbook of Applied Cryptography", ISBN: 0849385237, Oct. 1996.*

(Continued)

*Primary Examiner* — Peter Poltorak

(57) ABSTRACT

The present disclosure describes techniques and apparatuses for clone-resistant logic. In some aspects, this clone-resistant logic enables computing-device manufacturers to better protect their devices against use of inauthentic accessories.

20 Claims, 6 Drawing Sheets

(56) References Cited

U.S. PATENT DOCUMENTS

| | | | | |
|---|---|---|---|---|
| 8,610,454 | B2* | 12/2013 | Plusquellic et al. | 326/8 |
| 2002/0038222 | A1* | 3/2002 | Naka | 705/1 |
| 2002/0161986 | A1 | 10/2002 | Kamigata et al. | |
| 2003/0001650 | A1* | 1/2003 | Cao et al. | 327/277 |
| 2003/0061519 | A1* | 3/2003 | Shibata et al. | 713/202 |
| 2003/0065813 | A1* | 4/2003 | Ruehle | 709/238 |
| 2004/0003246 | A1* | 1/2004 | Hopkins et al. | 713/168 |
| 2004/0268075 | A1* | 12/2004 | Qawami et al. | 711/167 |
| 2005/0050542 | A1 | 3/2005 | Davis et al. | |
| 2007/0046511 | A1* | 3/2007 | Morzano et al. | 341/101 |
| 2007/0136561 | A1 | 6/2007 | Whalley et al. | |
| 2008/0151670 | A1* | 6/2008 | Kawakubo et al. | 365/222 |
| 2008/0229070 | A1* | 9/2008 | Charra et al. | 712/207 |
| 2008/0232179 | A1* | 9/2008 | Kwak | 365/194 |
| 2009/0019257 | A1 | 1/2009 | Shen et al. | |
| 2009/0055637 | A1* | 2/2009 | Holm et al. | 713/1 |
| 2010/0088484 | A1* | 4/2010 | Roohparvar | 711/168 |
| 2010/0199288 | A1 | 8/2010 | Kalman | |
| 2010/0272162 | A1 | 10/2010 | Simeon et al. | |
| 2011/0249718 | A1* | 10/2011 | Zerbe | 375/226 |
| 2012/0002803 | A1* | 1/2012 | Adi et al. | 380/28 |
| 2012/0106733 | A1* | 5/2012 | Falch et al. | 380/46 |
| 2013/0021482 | A1* | 1/2013 | Silverbrook | 348/207.2 |
| 2013/0311792 | A1* | 11/2013 | Ponnathota et al. | 713/300 |

OTHER PUBLICATIONS

Kumar, et al.,"A Multi-Core Approach to Addressing the Energy-Complexity Problem in Microprocessors", In Proceedings of WCED 2003, Jun. 2003, pp. 1-8.

"Final Office Action", U.S. Appl. No. 12/356,761, Jun. 3, 2011, 10 pages.

"Final Office Action", U.S. Appl. No. 12/254,506, Oct. 13, 2011, 26 pages.

"Non-Final Office Action", U.S. Appl. No. 12/274,235, Mar. 17, 2011, 11 pages.

"Non-Final Office Action", U.S. Appl. No. 12/254,506, Apr. 26, 2011, 18 pages.

"Non-Final Office Action", U.S. Appl. No. 12/356,761, Feb. 25, 2011, 8 pages.

"Notice of Allowance", U.S. Appl. No. 12/274,235, Sep. 16, 2011, 6 pages.

Kumar, et al.,"Single-ISA Heterogeneous Multi-Core Architectures: The Potential for Processor Power Reduction", In Proceedings of MICRO-36 2003, 2003, 12 pages.

Balakrishnan, et al.,"The Impact of Performance Asymmetry in Emerging Multicore Architectures", In Proceedings of ISCA 2005, 2005, 12 pages.

"Non-Final Office Action", U.S. Appl. No. 12/356,761, Nov. 18, 2014, 4 pages.

"Calling convention", Retrieved from <http://en.wikipedia.org/w/index.php?title=Calling_convention&oldid=162306164> on Apr. 15, 2014, Oct. 4, 2007, 2 pages.

"Final Office Action", U.S. Appl. No. 12/356,761, May 1, 2014, 6 pages.

"Non-Final Office Action", U.S. Appl. No. 12/254,506, Apr. 24, 2014, 18 pages.

"X86 Disassembly/Functions and Stack Frames", Retrieved from <http://en.wikibooks.org/w/index.php?title=X86_Disassembly/Functions_and_Stack_Frames&oldid=840982> on Apr. 13, 2014, Apr. 23, 2007, 5 pages.

Magnusson, "Understanding stacks and registers in the Sparc architecture(s)", Retrieved from <http://web.archive.org/web/20071020054930/http://www.sics.se/~psm/sparcstack.html> on Apr. 15, 2014, Mar. 1997, 9 pages.

"Non-Final Office Action", U.S. Appl. No. 12/356,761, Dec. 24, 2013, 11 pages.

Constantinou, et al., "Performance Implications of Single Thread Migration on a Chip Multi-Core", ACM SIGARCH Computer Architecture News, vol. 33 Issue 4, Nov. 2005, 12 pages.

"Advisory Action", U.S. Appl. No. 12/356,761, Aug. 8, 2014, 3 pages.

"Coding Laboratory—I2C on an AVR using bit banging", Retrieved from <http://codinglab.blogspot.com/2008/10/i2c-on-avr-using-bit-banging.html> on Sep. 22, 2014, Oct. 14, 2008, 5 pages.

"Final Office Action", U.S. Appl. No. 12/254,506, Oct. 9, 2014, 6 pages.

"Non-Final Office Action", U.S. Appl. No. 13/013,274, Sep. 19, 2014, 20 pages.

"Restriction Requirement", U.S. Appl. No. 12/356,761, Sep. 4, 2014, 5 pages.

"Final Office Action", U.S. Appl. No. 12/356,761, Mar. 4, 2015, 9 pages.

"Final Office Action", U.S. Appl. No. 13/013,274, Feb. 26, 2015, 20 pages.

Clements,"Principles of Computer Hardware", School of Computer, University of Teesside, Fourth Edition, 2006, 38 Pages.

* cited by examiner

CLONE-RESISTANT LOGIC

RELATED APPLICATIONS

This present disclosure claims priority to U.S. Provisional Patent Application Ser. No. 61/504,946 filed Jul. 6, 2011, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in the present disclosure and are not admitted to be prior art by inclusion in this section.

More and more, users wish to accessorize their computing devices. A user may wish to play music on his or her tablet computer using peripheral speakers or video on an auxiliary display. Manufacturers of these computing devices often wish to maintain the highest-quality experience for those using their devices by offering tested and proven accessories. In contrast, third parties may instead wish to sell accessories that the manufacturer has not tested or proven.

In an attempt to ensure that only tested and proven accessories are used by their computing devices, many manufacturers require their computing devices to authenticate accessories before use. Accessories can be authenticated through secure communication between the computing device and the accessory, generally using a secret stored on the accessory.

This secret, however, can be discovered by third parties. In some cases, for example, accessories include a chip that stores the secret in read-only memory within the chip. The chip uses this secret to establish secure communications to authenticate the accessory. A third party, however, may reverse engineer the chip, layer-by-layer, and, using sophisticated image-processing techniques, discover the secret within the read-only memory on the chip. With the secret, the third party can duplicate the functionality of the chip with an inauthentic chip, also called a "clone." This clone can then be used to fool the computing device into authorizing use of inauthentic accessories.

SUMMARY

This summary is provided to introduce subject matter that is further described below in the Detailed Description and Drawings. Accordingly, this Summary should not be considered to describe essential features nor used to limit the scope of the claimed subject matter.

An integrated-circuit chip is described that includes a hardwired logic structure having logic gates and storage elements. Portions of the hardwired logic structure are each configured to receive, from a number of the storage elements, binary inputs equal to the number of the storage elements. Each portion is configured to determine, based on the binary inputs and operation of the logic gates, a binary output and store that binary output. The storage elements of the hardwired logic structure provide a non-binary output aggregating the binary outputs of the portions of the hardwired logic structure.

A System-on-Chip (SoC) is described that comprises a communication port configured for communication with a host device, an authentication module configured to encrypt communication with the host device using a key, and an array of cells configured to produce the key where each cell of the array acts as a hardwired logic structure having a number Y of inputs and a single output. The SoC also includes connections between the cells of the array. These connections, in some aspects, have an irregular structure and routing, and connect the cells of the array such that each cell has the number Y of inputs, each of the inputs from a different cell of the array, and the single output of each cell is input to another cell of the array, the other cell of the array not being one of the different cells of the array from which input is received.

Further, a method is described that receives, at an accessory device having an integrated-circuit chip, a request to authenticate from a host device, the request including a number of clock cycles and a starting value. After reception, the method cycles the integrated-circuit chip through the number of clock cycles and uses the starting value to produce a secret key. The method then transmits an authentication response to the host device, the authentication response effective to authenticate the accessory device.

BRIEF DESCRIPTION OF THE DRAWINGS

The details of one or more implementations are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

The following discussion describes an operating environment, techniques that may be employed in the operating environment, and a System-on-Chip (SoC) in which components of the operating environment can be embodied. In the discussion below, reference is made to the operating environment by way of example only.

Operating Environment and Apparatuses

Figure 1:
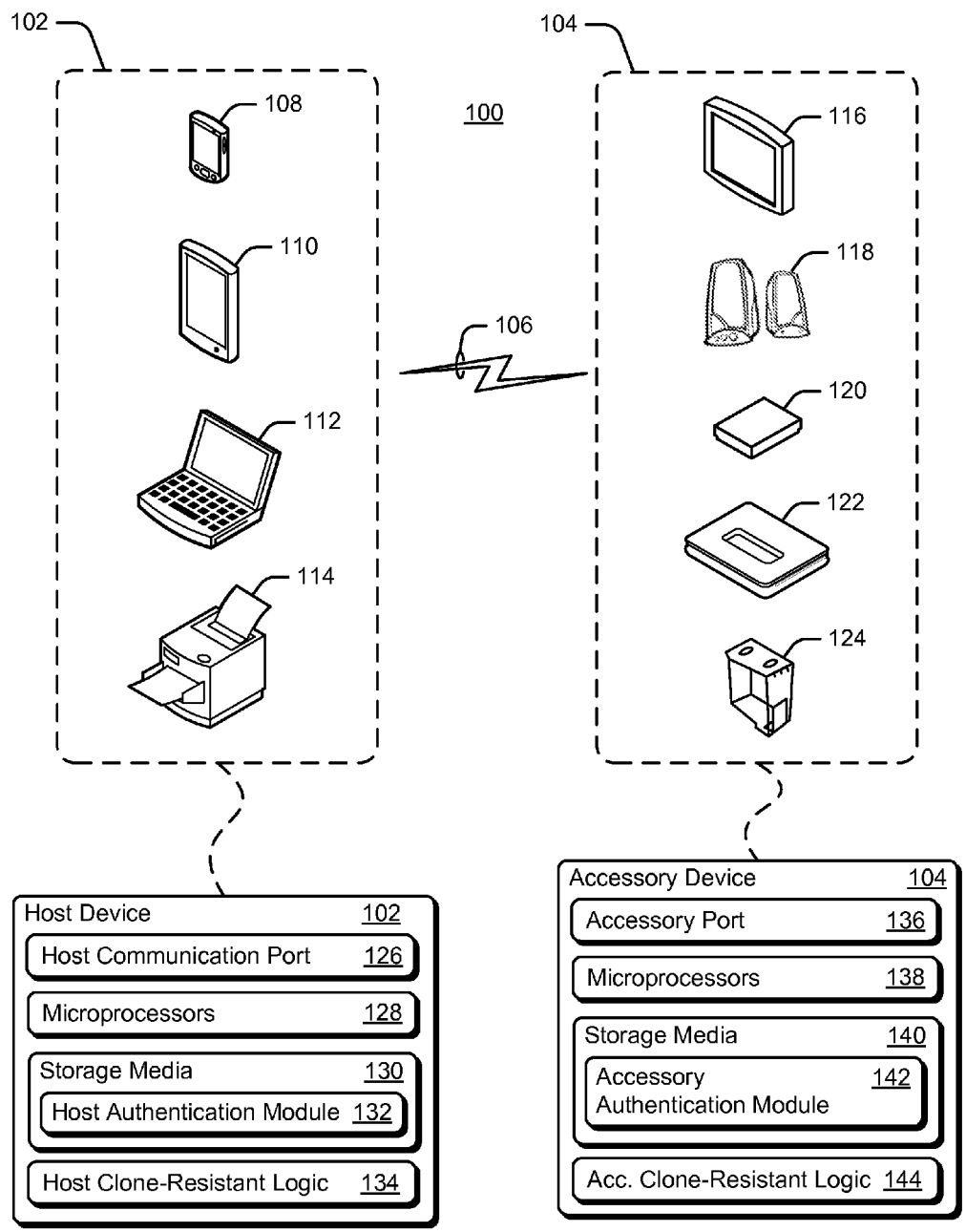
FIG. 1 illustrates an operating environment in which clone-resistant logic may be implemented.

FIG. 1 illustrates an example operating environment 100 having host computing devices 102 (host devices 102) and accessories 104, each of which are capable of communicating through connection 106. Connection 106 may use wired or wireless communications, such as data, packets, and/or frames over a wireless-local-area network (WLAN), or an integrated-circuit to integrated-circuit ($I^2C$) bus, a low pin count (LPC) bus, a serial peripheral interconnect (SPI) bus, universal asynchronous receiver/transmitter (UART) bus, or 1-wire bus, to name just a few.

Host devices 102 include smart-phone 108, tablet computer 110, laptop computer 112, and multi-function printer 114. Although not shown, other configurations of host devices 102 are also contemplated, such as a desktop computer, server, mobile-internet device (MID), mobile gaming console, digital camera, electronic readers or books (e-readers or e-books), internet protocol enabled televisions (IP TVs), and so on.

Accessories 104 include peripheral display 116, auxiliary speakers 118, battery 120, battery charger 122, and consumable toner cartridge 124 (toner cartridge 124). Although not shown, other configurations of accessories 104 are also contemplated, such as internal hard drives, external memory devices, memory cards, graphics cards, Wi-Fi-enabling devices, keyboards, mice, gaming controllers, cameras, microphones, and so on.

Host device 102 includes a host communication port 126, one or more micro-processors 128, and computer-readable storage media 130 (storage media 130). Host communication port 126 is configured to communicate with accessories 104 through connection 106. Storage media 130 includes host authentication module 132. Host authentication module 132 may use a key to authenticate an accessory, such as a key generated by host clone-resistant logic 134.

Storage media 130 may include any suitable memory or storage device such as static RAM (SRAM), ROM, or Flash memory useful to store data of applications or firmware, and may be embodied, along with one or more of microprocessors 128 and host authentication module 132, on a System-on-Chip (SoC). This SoC may also include host clone-resistant logic 134 and secure communications or connections between host authentication module 132 and host clone-resistant logic 134. Micro-processors 128 are capable of executing computer-executable instructions of any of the entities of host device 102, such as host authentication module 132. Note that host authentication module 132 may also or instead be implemented in hardware.

Host clone-resistant logic 134 includes a hardwired logic structure organized with logic and memory elements. In some embodiments, host clone-resistant logic 134 includes hardwired lookup tables (LUTs) capable of generating a number that may be used as a secret key. These hardwired LUTs include cells arranged in an array, including Boolean logic gates, and/or binary-state storage elements.

Accessory 104 includes an accessory communication port 136 (accessory port 136), one or more accessory microprocessors 138 (microprocessors 138), and accessory computer-readable storage media 140 (storage media 140). Accessory communication port 136 is configured to communicate with host devices 102 through connection 106. Storage media 140 includes accessory authentication module 142. Accessory authentication module 142 is configured to encrypt communications with host device 102 using a key. The key is generated by, or derived from a number generated by, accessory clone-resistant logic 144. Through use of this key, accessory authentication module 142 attempts to prove that accessory 104 is authentic. While environment 100 describes clone-resistant logics 134 and 144 in the context of authenticating accessories, environment 100 is not intended to limit application of clone-resistant logic. Clone-resistant logic may also be used in other applications.

Storage media 140 may include any suitable memory or storage device such as static RAM (SRAM), ROM, or Flash memory useful to store data of applications or firmware, and may be embodied, along with one or more of microprocessors 138 and accessory authentication module 142, on a system-on-chip (SoC). This SoC may also include accessory clone-resistant logic 144 and secure communications or connections between accessory authentication module 142 and accessory clone-resistant logic 144. Micro-processors 138 are capable of executing computer-executable instructions of any of the entities of accessory 104, such as accessory authentication module 142. Note that accessory authentication module 142 may also or instead be implemented in hardware.

Accessory clone-resistant logic 144, like host clone-resistant logic 134 described above, is organized with logic and memory elements and/or includes hardwired lookup tables (LUTs) capable of generating a secret key. These hardwired LUTs, in this example, include cells arranged in an array, Boolean logic gates, and/or include binary-state storage elements. Various embodiments of clone-resistant logic of the host and accessory and ways in which it may operate are set forth in greater detail herein.

Clone-resistant logic enables computing-device manufacturers to better protect their devices against use of inauthentic accessories. Consider, for example, a printer manufacturer that builds printers and consumable accessories for those printers. These printers can be designed to scan, print, and copy using tested and proven consumable accessories, such as cyan, magenta, yellow, and black toner cartridges. Toner, of course, may run out over time. When the printer's toner runs out, new toner cartridges can be used. Third parties, however, wish to sell inauthentic toner cartridges for use in the manufacturer's printer.

To prevent inauthentic toner cartridges from being used by the printer, current techniques build a chip into authentic toner cartridges. This chip often includes a secret stored in a fuse or read-only memory within the chip. This chip, however, can be ground down, layer-by-layer, to find the secret in the memory. With the secret, the third party may then reverse engineer functions of the chip. When complete, the third party may then create a clone of the chip that, while not identical, acts similarly enough to the chip to fool the printer into using the toner cartridge.

Inauthentic accessories, however, whether they include toner cartridges, batteries or battery chargers, or auxiliary displays and speakers, can damage a computing device, the device maker's reputation, or the device maker's return on its investment, especially in cases where the computing device is sold at a loss.

This document describes various techniques and apparatuses that use or include clone-resistant logic. An integrated-circuit chip having this clone-resistant logic can be extremely difficult to clone. Consider, for example, a case where instead of a chip having a secret stored in read-only memory that may be discovered, the techniques build a chip having an array of hardwired lookup tables composed of logic gates. A third party, in order to clone the functions of the chip, will need to determine, with perfect or near-perfect accuracy, the logic structure of the chip, otherwise the logic will not be reproduced. Grinding down the chip layer-by-layer and processing images of each of these layers often determines the logic structure only to a 95- to 99-percent accuracy. But even 99-percent accuracy is not sufficient to duplicate the functions of these hardwired lookup tables (LUTs). Simply put, some entries of the hardwired LUTs of a clone will not match entries of the authentic chip's hardwired LUTs using these grinding-and-image-processing discovery methods.

In some aspects, an integrated-circuit chip having clone-resistant logic can be included in both an authentic accessory and the computing device that will use the accessory, such as is illustrated in FIG. 1. If both have identical hardwired logic structures, the computing device and the accessory may cycle the chip some same number of times, such as 5,000, and both will provide a same number. This number need not be communicated between the computing device and the accessory, as doing so may permit third parties to discover information about the chip. Instead, communications may be encrypted using the number or a derivative thereof as a key. The computing device can then determine whether or not the accessory is authentic by a successful decryption of the communication using the same key, which is provided by the chip at the computing device. By so doing, the example printer can determine that the accessory is authentic. Note that cycling the chip a large number of times can be fast, consume little power, and make very likely that all of the gate-logic of the hardwired logic structure is used to produce the key. When all of the gate-logic is used, all of the gate-logic must act the same, which exposes a clone even if the clone has very few errors.

Figure 2:
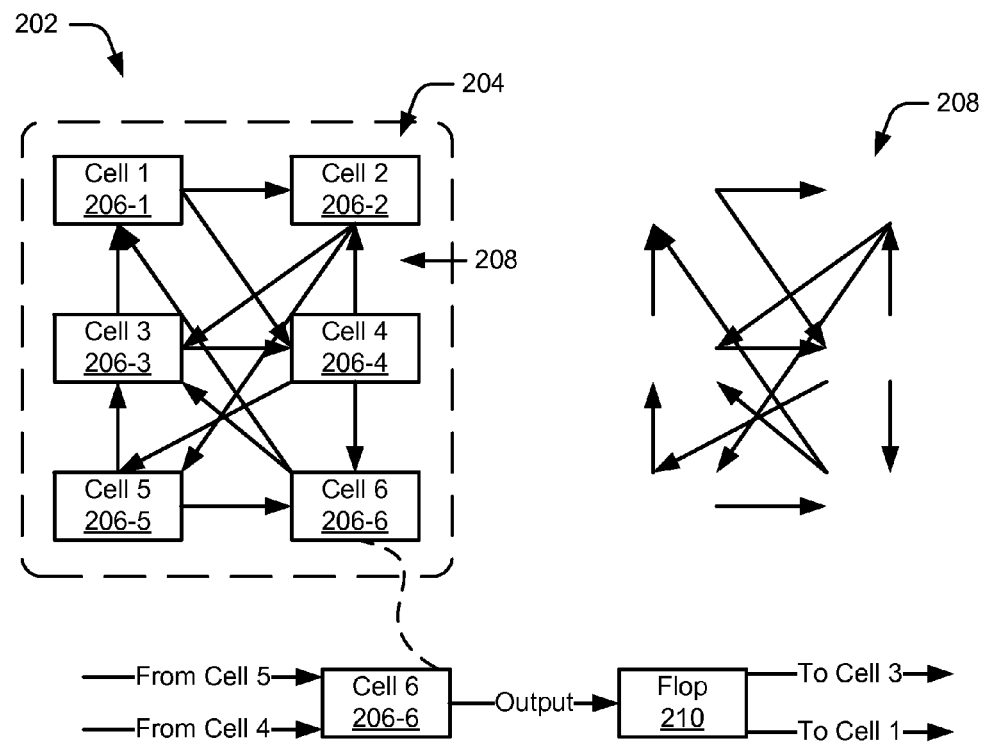
FIG. 2 illustrates example clone-resistant logic structured as an array of cells.

By way of example, consider FIG. 2, which illustrates example clone-resistant logic 202 structured as array 204 of cells 206. For visual simplicity, array 204 includes six cells 206 (numbered 206-1, 206-2, 206-3, 206-4, 206-5, and 206-6, respectively) with each cell 206 having two inputs and a single output. Clone-resistant logic 202 also includes connections 208 between cells 206 (shown with arrows indicating direction of data flow). Connections 208 are also shown separated from array 204 to better illustrate the example structure and routing, which here is irregular in both structure and routing. This irregular structure and routing can aid in making the logic of the chip more difficult to determine.

Connections 208 connect cells 206 of array 204 such that each cell 206 has a number Y of inputs, each of the number Y inputs from a different cell 206 of array 204. Thus, each cell 206 may have the number Y inputs from 2^Y possible inputs. These connections 208 also enable output from each cell 206 to be received as input to another cell of the array. In some embodiments, including clone-resistant logic 202, connections 208 enable output from each cell 206 to be received as input by another cell 206 from which input was not received.

To further illustrate the input and output of cells 206, consider cell 206-6, which receives input from cells 206-4 and 206-5 and outputs a binary number, which is then stored in an example type of binary-state storage element, namely flop 210 (not shown in clone-resistant logic 202 for visual brevity), which is then output to cell 206-3 and cell 206-1. These cells 206-3 and 206-1, on a following clock cycle, use the binary number from flop 210 as input, along with input from another cell 206 of array 204. When clone-resistant logic 202 completes its last cycle, a number is output based on the binary data within each of flops 210, such as an aggregate of all of the outputs of the cells (here a six-digit number, e.g., 100101).

This small number of cells and inputs of FIG. 2 are provided as an aid to describing clone-resistant logic 202. In some embodiments, however, a chip having clone-resistant logic 202 includes many more cells and inputs, such as thirty-two cells with each cell having eight inputs or 512 cells with each cell having 16 inputs. Some examples of 512-cell arrays may have more than 60,000 logic gates, making cloning of the logic very difficult to achieve.

As noted in part above, each cell of array 204 is hardwired and acts as a lookup table (LUT). While shown as discrete cells of an array, clone-resistant logic 202 may instead be distributed as many gates (e.g., Boolean logic gates) and binary-state storage elements (e.g., flip-flops or latches) without being arranged as discrete cells. Clone-resistant logic 202, whether arranged in cells of an array or otherwise, acts as multiple hardwired LUTs each configured to receive, as input, output from another LUT produced during a prior cycle (or initial value). Each LUT then produces an output, which can be used to determine a secret key or passed to other LUTs for another cycle and so forth.

Thus, in some embodiments, a hardwired LUT can be configured to receive, from a number of binary-state storage elements, binary inputs equal to the number of the binary-state storage elements. Once received, the hardwired LUT can determine, based on the binary inputs and operation of logic gates, a binary output. This binary output can be stored in a binary-state storage element that is not one of the number of the binary-state storage elements from which the number of the binary inputs is received. The binary-state storage elements can be configured to provide either input for another cycle or, when the cycles are complete, a secret key based on data stored. This secret key is an aggregate of the binary outputs of the hardwired LUTs, however, other uses of the outputs are possible.

Figure 3:
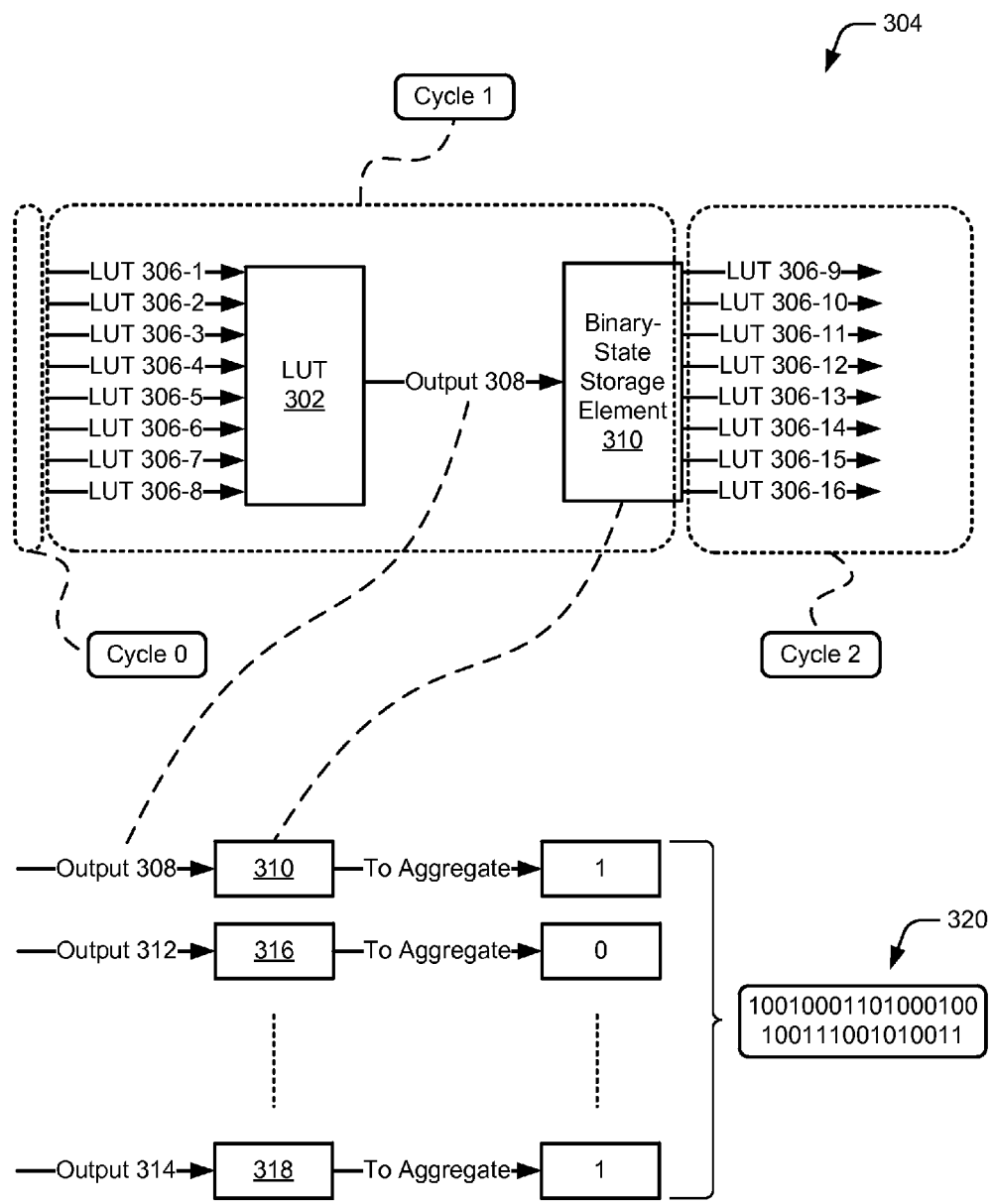
FIG. 3 illustrates an example of a portion of a hardwired logic structure having a hardwired lookup table and a data flow showing input into and output out of the hardwired lookup table at a particular cycle of an integrated-circuit chip and an aggregate of multiple outputs of multiple hardwired lookup tables.

By way of example, consider FIG. 3, which illustrates an example of a hardwired logic structure including a hardwired LUT 302 and a data flow 304 showing input into and output out of LUT 302 at a particular cycle of an integrated-circuit chip having LUT 302. After cycle 0 is performed by the chip or as a starting state, input is received from each of eight LUTs 306-1 to 306-8 by LUT 302 at cycle 1. Also at cycle 1, LUT 302 produces an output 308, which is then stored in binary-state storage element 310. At cycle 2, output 308 is passed from element 310 to eight more LUTs 306-9 to 306-16, these eight more LUTs 306 not being any one of the eight LUTs 306 from which input was received. Cycle 2 is then performed, where LUT 302 receives new input from LUTs 306-1 to 306-8. The other eight LUTs 306-9 to 306-16 produce output based in part of output 308 from element 310. The example constrains the routing between LUTs to not flow back to a LUT from which an input is received. This constraint is not required but can aid in making the clone-resistant logic having the LUTs more difficult to clone.

FIG. 3 also illustrates an example showing multiple outputs from multiple hardwired LUTs. For visual brevity, outputs from three of thirty-two LUTs are shown, output 308 of the above-mentioned hardwired LUT 302 and two other outputs 312 and 314 of other hardwired LUTs (not shown). These outputs 308, 312, and 314 are stored in the above-mentioned binary-state storage element 310 and two other binary-state storage elements 316 and 318, all respectively. Outputs 308, 312, and 314 and twenty-nine other outputs can be aggregated into a secret key 320. Thus, this example shows aggregation into secret key 320 of 32 outputs of 32 hardwired LUTs on completion of cycle 1.

Each hardwired LUT, again whether arranged in a cell or otherwise, includes hardwired logic. By way of example of this hardwired logic, consider FIG. 4, which illustrates a cell 402 of an array, cell 402 having Boolean logic gates 404, and a flop 406 to retain a binary output. Note that cell 402 only includes flop 406. Cell 402 does not include read-only memory, eFuse, OTP, MTP, EEPROM, eFlash, or one-time programmable memory, which is excluded from the array and the chip having the array and cells. Note that internal connections between the Boolean logic gates 404, such as internal connections 408, have a complex and irregular structure and routing. This complexity may act to make more difficult analysis of the logic of cell 402. An attempt to determine the logic of cell 402 by exposing various layers and analyzing the physical structure and routing of each exposed layer can be made difficult through this complexity.

Hardware LUTs' output can be configured to appear random while maintaining a complex structure and routing. This structure and routing is more complex if the LUTs' output is made to appear random but within constraints. These constraints can act to complicate the LUTs, such as by increasing an amount of Boolean logic gates for each of the LUTs beyond what logic designed to produce a purely random output is likely to provide. In some embodiments, the constraints require that about half of the outputs are an XOR of the inputs, about one quarter of the outputs are one, and about one quarter of the outputs are zero. Logic designed based on a purely random output, however, often has some simple logical structures.

Techniques Using Clone-Resistant Logic

Figure 5:
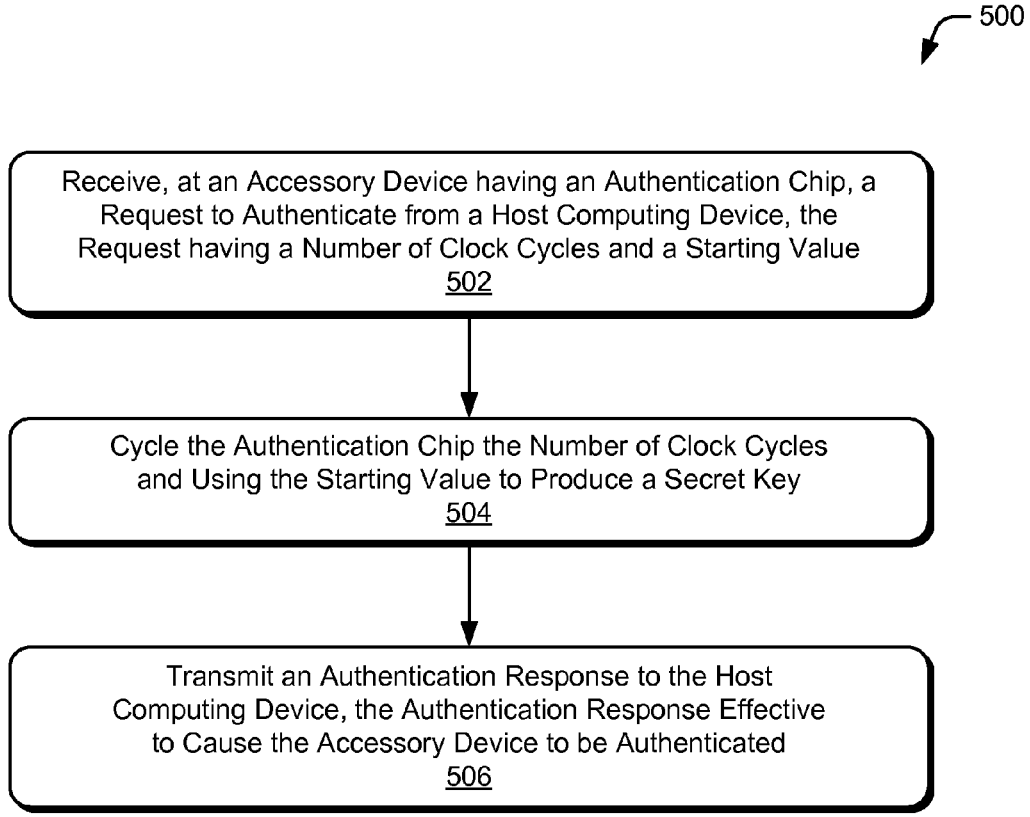
FIG. 5 illustrates a method using clone-resistant logic in the context of authenticating accessories prior to use by a host computing device.

The following discussion describes techniques for using clone-resistant logic, here in the context of authenticating accessories prior to use by a host computing device. These techniques can be implemented in, or use elements of, the previously described environments, such as host device 102 and accessory device 104 of FIG. 1. These techniques include a method 500 illustrated in FIG. 5, which is shown as a set of operations performed by one or more entities. This method is not necessarily limited to the order shown for performing the operations. In portions of the following discussion, reference will be made to operating environment 100 of FIG. 1 by way of example. Such reference is not to be taken as limiting the method to use in operating environment 100 but rather as illustrative of one of a variety of examples.

At 502, a request to authenticate is received at an accessory device having an integrated-circuit chip on which clone-resistant logic is embodied and from a host device, the request including a number of clock cycles and a starting value. As noted above, this integrated-circuit chip can be included within a System-on-Chip having accessory authentication module 142 and embody accessory clone-resistant logic 144. However embodied, the integrated-circuit chip may forgo storing a secret key prior to cycling of the integrated-circuit chip. In so doing, the secret key may not be determined through many discovery mechanisms that determine memory contents, such as image-processing of a ROM or eFuse.

At 504, the integrated-circuit chip is cycled the number of clock cycles and using the starting value to produce a secret key or a number on which a secret key can be based, such as a hash of the number. While a small number of cycles of the integrated-circuit chip may be performed, increasing the number increases the likelihood that all or nearly all of the gates and circuitry of accessory clone-resistant logic 144 are used, thereby increasing the chance that any flaw in a clone will be used and thus cause a failure to produce a same number as host clone-resistant logic 134 of host device 102. Clock cycles in excess of 500 can easily be performed, as can many thousands. Note that host device 102 may vary this number of cycles for each use and for various accessories, generally at random, though this is not required.

At 506, an authentication response is transmitted to the host device, the authentication response effective to authenticate an accessory device. The authentication response, in some cases, is encoded with or contains a secret key. The secret key can be the number generated by the integrated-circuit chip or based on that number, such as a hash of the number.

By way of example, assume that multi-function printer 114 of FIG. 1 includes a System-on-Chip having firmware with host authentication module 132. Assume also that the System-on-Chip includes a hardwired logic structure in which host clone-resistant logic 134 is embodied as an array of cells, each of the cells acting as a hardwired lookup table (LUT), such as described in one or more of FIGS. 2, 3, and 4. Assume also that two toner cartridges 124 are inserted into multi-function printer 114, one having red toner and the other black toner. On insertion, communication channels (e.g., connection 106) are established between multi-function printer 114 and the toner cartridges through host communication port 126 and accessory ports 136. At this point, the host computing device (e.g., multi-function printer 114) has not authenticated accessory devices (e.g., toner cartridges 124). Now assume that a user of the multi-function printer 114 wishes to print a document. Printing this document requires both red and black toner of the inserted toner cartridges 124.

To authenticate these toner cartridges, host authentication module 132 determines two random clock cycles between 1,000 and 20,000, here assume 3,476 for the red toner cartridge and 6,102 for the black toner cartridge. Host authentication module 132 also determines a random number for each toner cartridge to use as a starting value, the random number having a same number of digits as LUTs in the accessory clone-resistant logic 144, here two random 512-bit numbers of ones and zeros. At this point, multi-function printer 114 provides the clock cycles and 512-bit numbers to each of the toner cartridges 124.

Figure 4:
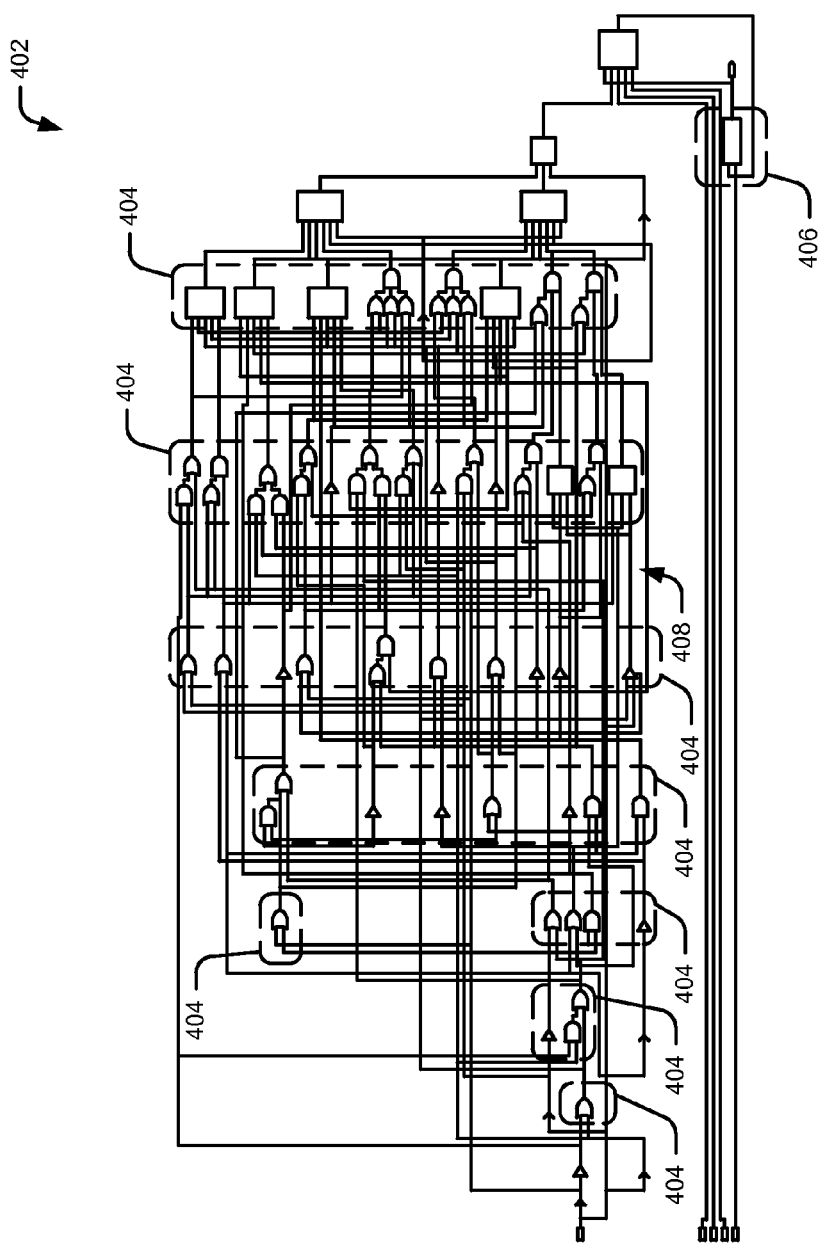
FIG. 4 illustrates a cell of an array, the cell having Boolean logic gates and a flop to retain a binary output.

Assume also that each of the toner cartridges 124 also includes a System-on-Chip having firmware, here the firmware includes accessory authentication module 142 and an integrated-circuit in which accessory clone-resistant logic 144 is embodied as an array of cells, each cell in the array of cells acting as a hardwired lookup table (LUT), such as described in one or more of FIGS. 2, 3, and 4. Note that the accessory clone-resistant logic 144 for both toner cartridges 124 and the host clone-resistant logic 134 may all be functionally identical unless one of the toner cartridge's integrated-circuit is a clone.

At 502, both toner cartridges 124 receive their respective clock cycles and 512-bit starting values. At 504, both accessory authentication modules 142 set the starting value for each of the 512 cells acting as LUTs to the corresponding ones or zeroes of the 512-bit number. The red toner cartridge then cycles the integrated-circuit chip 3,476 times. The black toner cartridge then cycles its integrated-circuit chip 6,102 times. When complete, each uses the 512-bit resulting number to encode a response to the request from the host device, which each toner cartridge 124 sends at block 506.

Prior to, or on receipt of the encoded response from toner cartridges 124, host authentication module 132 uses the starting value for the red toner cartridge as a starting value of its integrated-circuit chip and cycles the logic 3,476 times. Host authentication module 132 then attempts to decode the encoded response from the red toner cartridge using the 512-bit number. If the response from the red toner cartridge is decodable, host authentication module 132 determines that the accessory clone-resistant logic 144 of the integrated-circuit of the red toner cartridge is authentic, and thus that the red toner cartridge is also authentic. Host authentication module 132 acts likewise for the black toner cartridge. Assuming that both are determined to be authentic, multi-function printer 114 prints the document with red and black toner from the red and black toner cartridges 124.

System-on-Chip

Figure 6:
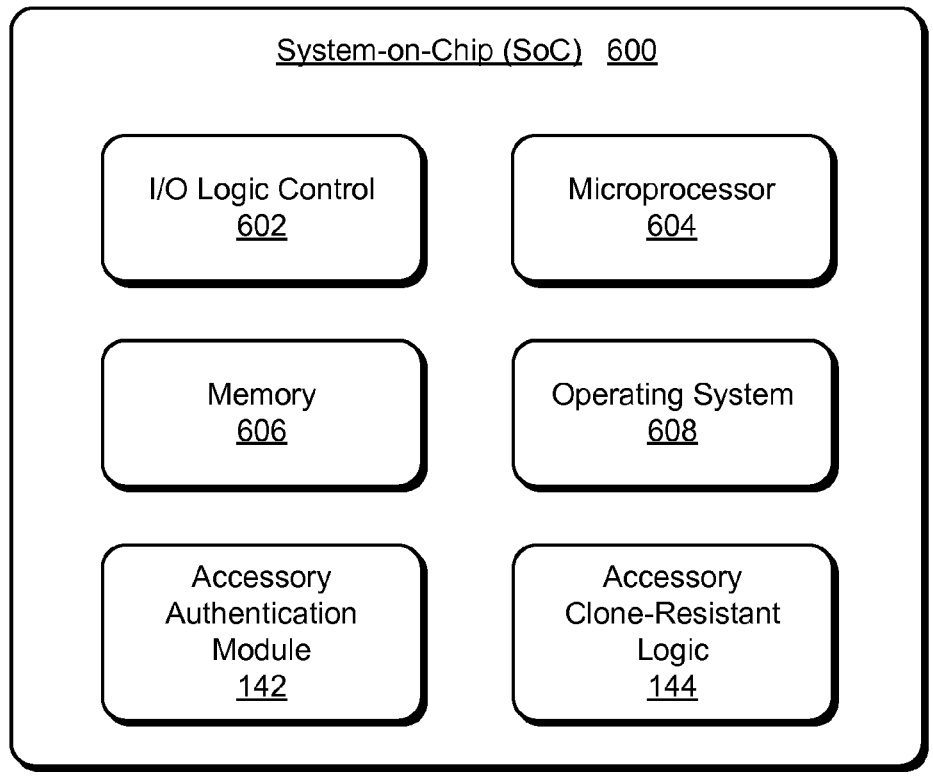
FIG. 6 illustrates a System-on-Chip (SoC) environment for implementing aspects of the techniques described herein.

FIG. 6 illustrates a System-on-Chip (SoC) 600, which can implement various aspects described above. A SoC can be implemented in any suitable device, such as above-mentioned accessory devices, a video game console, IP enabled television, desktop computer, laptop computer, tablet computer, smart-phone, server, network-enabled printer, set-top box, printer, scanner, camera, picture frame, mobile internet device, and/or any other type of device that may act as a host or accessory device.

SoC 600 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 600 can also include an integrated data bus (not shown) that couples the various components of the SoC for data communication between the components.

In this example, SoC 600 includes various components such as an input-output (I/O) logic control 602 (e.g., to include electronic circuitry) and a microprocessor 604 (e.g., any of a microcontroller or digital signal processor). SoC 600 also includes a memory 606, which can be any type of RAM, low-latency nonvolatile memory (e.g., flash memory), ROM, and/or other suitable electronic data storage. SoC 600 can also include various firmware and/or software, such as an operating system 608, which can be computer-executable instructions maintained by memory 606 and executed by microprocessor 604. SoC 600 can also include other various communication interfaces and components, communication components, other hardware, firmware, and/or software.

SoC 600 includes accessory authentication module 142 and accessory clone-resistant logic 144, though SoC may also include an integrated-circuit chip having accessory clone-resistant logic 144. Other embodiments of an SoC may include the above elements when used by a host computing device, though with host authentication module 132 and host clone-resistant logic 134. Examples of these various components, functions, and/or entities, and their corresponding functionality, are described with reference to the respective components of the environment 100 shown in FIG. 1 as well as aspects described in FIGS. 2, 3, and 4. Accessory authentication module 142 can be implemented as hardware, firmware, fixed logic circuitry, or any combination thereof that is implemented in connection with the I/O logic control 602 and/or other signal processing and control circuits of SoC 600.

Although the subject matter has been described in language specific to structural features and/or methodological operations, it is to be understood that the subject matter defined in the appended claims is not necessarily limited to the specific features or operations described above, including orders in which they are performed.

What is claimed is:
1. A System-on-Chip (SoC) comprising:
a communication port configured for communication with a host device, the communication including:
reception of an authentication request from the host device, the authentication request including, specific to a device comprising the SoC, a number of clock cycles and a starting value, the starting value having a number of digits; and
transmission of an authentication response;
an authentication module configured to encrypt the authentication response using a key;
an array of cells, the array of cells having a number of cells matching the number of digits of the starting value and configured to produce the key by:
being cycled a number of times matching the number of clock cycles, a first cycle using the starting value as an input to the array; and
aggregating, at a last cycle, a last output from each cell of the array to produce the key, the last output being a last of multiple single outputs from each cell of the array, each cell of the array acting as a hardwired logic structure having a number Y of inputs and a single output for each cycle;
connections between the cells of the array, the connections: having irregular structure and routing; and
connecting the cells of the array such that:
each cell has the number Y of inputs, each of the inputs from a different cell of the array; and
the single output of each cell is input to another cell of the array, the other cell of the array not being one of the different cells of the array from which input is received.

2. The System-on-Chip of claim 1, wherein each cell of the array includes Boolean logic gates and internal connections between the Boolean logic gates, the internal connections having an irregular structure and routing.

3. The System-on-Chip of claim 1, wherein each of the number Y of the inputs is binary and the single output of each of the cells is binary.

4. The System-on-Chip of claim 1, wherein each cell of the array contains a flop, the flop retaining the single output of the cell.

5. The System-on-Chip of claim 1, wherein each cell of the array acts as a hardwired lookup table without memory other than a binary-state storage element capable of storing the single output.

6. The System-on-Chip of claim 1, wherein each cell of the array acts as a hardwired logic structure having the number Y of inputs and the single output effective to produce outputs appearing random but according to constraints, the constraints including a first amount of outputs that are an XOR of the inputs, a second amount of outputs that are one, and a third amount of outputs that are zero.

7. The System-on-Chip of claim 1, wherein each cell has $2^Y$ possible inputs.

8. A method comprising:
receiving, at an accessory device having an integrated-circuit chip, a request to authenticate from a host device, the request specific to the accessory device and including a number of clock cycles and a starting value;
cycling the integrated-circuit chip the number of clock cycles and using the starting value to produce a secret key, the integrated-circuit chip including:
an array of cells having a number of cells matching a number of digits of the starting value, each cell of the array acting as a hardwired logic structure having a number Y of inputs and a single output for each cycle;
connections between the cells of the array, the connections:
having irregular structure and routing; and
connecting the cells of the array such that:
each cell has the number Y of inputs, each of the inputs from a different cell of the array; and
the single output of each cell is input to another cell of the array, the other cell of the array not being one of the different cells of the array from which input is received,
the cycling of the integrated-circuit chip including, at a last cycle of the cycling, a last output from each cell of the array;
aggregating the last output from each cell of the array to produce the secret key; and
transmitting an authentication response to the host device, the authentication response containing or encoded using the secret key.

9. The method of claim 8, further comprising, prior to transmitting the authentication response, encoding the authentication response with the secret key.

10. The method of claim 8, wherein the authentication response contains, but is not encoded using, the secret key.

11. The method of claim 8, wherein the integrated-circuit chip does not include the secret key prior to cycling the integrated-circuit chip.

12. The method of claim 8, wherein each cell of the array of the integrated-circuit chip acts as a hardwired lookup table having multiple Boolean logic gates and a binary-state storage element.

13. The method of claim 8, wherein each of the number Y of the inputs is binary and the single output of each of the cells is binary.

14. The method of claim 8, wherein each cell of the array contains a flop, the flop retaining the single output of the cell.

15. The method of claim 8, wherein each cell of the array acts as a hardwired lookup table without memory other than a binary-state storage element capable of storing the single output.

16. A method comprising:
providing, from a host device, a request for authentication to an accessory device, the request specific to the accessory device and including a number of clock cycles and a starting value;
receiving an authentication response from the accessory device, the authentication response containing or encoded using a secret key;
determining an authenticity of the accessory device using a key generated for authentication, the authentication key generated by:
cycling an integrated-circuit chip the number of clock cycles and using the starting value to produce the authentication key, the integrated-circuit chip including:
an array of cells having a number of cells matching a number of digits of the starting value, each cell of the array acting as a hardwired logic structure having a number Y of inputs and a single output for each cycle;
connections between the cells of the array, the connections:
having irregular structure and routing; and
connecting the cells of the array such that:
each cell has the number Y of inputs, each of the inputs from a different cell of the array; and
the single output of each cell is input to another cell of the array, the other cell of the array not being one of the different cells of the array from which input is received,
the cycling of the integrated-circuit chip including, at a last cycle of the cycling, a last output from each cell of the array; and
aggregating the last output from each cell of the array to produce the authentication key; and
responsive to the determining, authenticating the accessory device.

17. The method of claim 16, further comprising determining the number of clock cycles, the number of clock cycles being a random number.

18. The method of claim 16, further comprising determining the starting value, the starting value being a random number but having the number of digits matching the number of cells.

19. The method of claim 16, wherein determining the authenticity comprises decoding the authentication response using the authentication key.

20. The method of claim 16, wherein each cell of the array of the integrated-circuit chip acts as a hardwired lookup table having multiple Boolean logic gates and a binary-state storage element.

* * * * *